United States Patent [19]
Plunkett

[11] 3,859,579
[45] Jan. 7, 1975

[54] PROTECTION CIRCUIT FOR POWER CONVERTER SYSTEMS

[75] Inventor: Allen B. Plunkett, Lawrence Park, Pa.

[73] Assignee: General Electric Company, Erie, Pa.

[22] Filed: Jan. 27, 1974

[21] Appl. No.: 436,165

[52] U.S. Cl. .................. 318/227, 318/230, 318/231
[51] Int. Cl. ............................................. H02p 5/40
[58] Field of Search ...... 318/227, 230, 231; 317/13, 317/31; 321/5, 14

[56] References Cited
UNITED STATES PATENTS

| | | | |
|---|---|---|---|
| 3,671,831 | 6/1972 | Chausse et al. ..................... | 318/227 |
| 3,769,564 | 10/1973 | Rettig ................................ | 318/227 |
| 3,775,651 | 11/1973 | Graf et al. .......................... | 318/227 |
| 3,796,935 | 3/1974 | Blaschke ............................ | 318/227 |

*Primary Examiner*—G. Z. Rubinson
*Attorney, Agent, or Firm*—Dana F. Bigelow; Walter C. Bernkopf

[57] ABSTRACT

A power conversion system operates in response to a current call signal whose polarity determines the mode of operation, either motoring or braking. A plurality of limiting parameters are established for the system and each is compared by a summing amplifier with an actual system condition being monitored. The resulting plurality of error signals are compared and the highest one is selected and applied to modulate the system. Modulation is obtained by reducing the current call signal in proportion to the value of the highest error signal, thereby causing an equal reduction in the current flow between the converter and the load. One of the monitored conditions in an inverter system is the absolute value of the current flow between the inverter and the load, and its associated limiting parameter is the dc inverter voltage. In this way, the motor current is limited, among other ways, in relation to the magnitude of the dc inverter voltage or the relative capability of the inverter to commutate the current. Provision is made to apply the motor current error signal when operating in either motoring or braking modes of operation.

20 Claims, 2 Drawing Figures

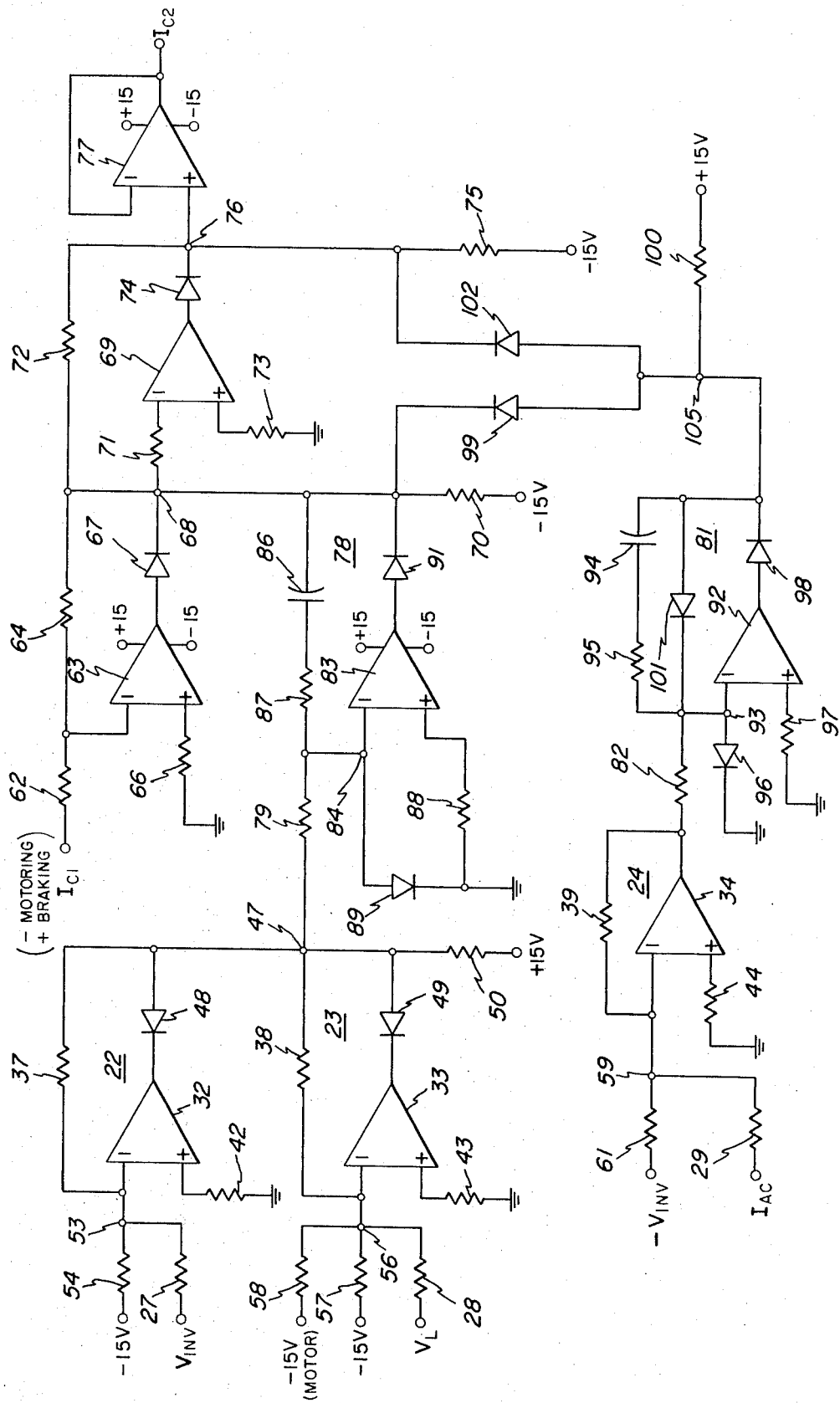

PROTECTION CIRCUIT FOR POWER CONVERTER SYSTEMS

BACKGROUND OF THE INVENTION

This invention relates generally to circuit protective systems and more particularly to protective modulation of inverter control circuits of propulsion systems such as transit cars.

This invention is particularly applicable to the control of power conversion systems of the general type disclosed and claimed by copending patent application entitled "Braking Effort Control" and "Automatic IR Compensation" filed concurrently herewith in the name of the present inventor and assigned to the assignee of the present invention. While the present invention will be described herein in connection with a propulsion control system of the type taught by the aforesaid patent application to the extent necessary for a full and complete understanding of the invention, a more complete understanding of such a circuit may be obtained from the aforesaid patent application.

Modern power conversion systems employ semiconductor components which are sensitive to excessive currents and voltages. Continual replacement of the components would be prohibitively expensive, and disruptive operation resulting from the use of devices such as circuit breakers and fuses can generally not be tolerated in sophisticated power control systems such as those used in propulsion systems. It is therefore preferable to regulate within predetermined parameters the voltage and current being delivered to the conversion apparatus.

In power conversion systems of the type wherein an inverter is connected to receive power from a dc source and deliver ac power to a load such as a traction vehicle propulsion motor it is known in the art to reverse the process by a procedure known as dynamic braking. In such a process the motor is used as a generator and current is sent back through the inverter to the line where it is either dissipated in the series of resistors (dynamic braking), or returned to the dc source (regenerative braking).

During braking periods of operation, the voltages to which the inverter is exposed are greater than those to which it is exposed during motoring. This occurs both in regenerative and in dynamic modes since the voltage at the inverter input terminals is greater than that at the source line due to the impedance therebetween. In regeneration modes, the high voltage becomes more critical when, for instance, the line is poorly receptive and the dc inverter tends to climb.

Alternatively if the line is excessively receptive as for example, when a plurality of transit cars are simultaneously starting up, the line voltage will be low and the inverter current will tend to rise to try and maintain the braking effort. Since the pulse commutated inverter's ability to commutate the current is determinate on the inverter dc voltage, the rising current if allowed to rise unhindered will be excessive and harmful to the inverter components. Similarly in the motoring mode, if the line voltage drops the inverter is not able to commutate the motor current and the relatively high current may be destructive if not controlled.

It is therefore an object of this invention to provide an improved control circuitry for a power conversion system.

Another object of this invention is the provision for simultaneously protecting an energy conversion system from excessive voltages and currents.

Yet another object of this invention is the provision for limiting the voltage at the input terminals of an inverter during braking modes of operation of a motor connected to the output terminals thereof.

Still another object of this invention is the provision for limiting the current flow between an inverter and drive motor during both motoring and braking modes of operation.

A further object of this invention is the provision of an effective and economical protection circuit for an energy conversion system.

These objects and other features and advantages become more readily apparent upon reference to the following description when taken in conjunction with the appended drawings.

SUMMARY OF THE INVENTION

Briefly, in accordance with one aspect of the invention a power conversion apparatus is controlled in response to a current call signal which represents the desired current flow between the conversion apparatus and an associated drive motor. The polarity of the current call signal determines whether the system is in either a motoring or a braking mode of operation. When one of the system conditions exceeds the level of its associated predetermined parameter the current call signal is proportionately reduced and in turn the converter current flow is accordingly reduced. Where a plurality of parameters are established, provision is made to look at each one in relation to its actual system condition and compare the resulting error signals to select the highest error signal for application to and reduction of the current call signal.

By another aspect of the invention one of the system conditions monitored when in either motoring or braking is the absolute value of the peak current flow between the inverter and motor. The peak current signal is compared with a signal representative of the dc inverter voltage. Since the capability of the inverter to commutate current is determinant on the voltage across its input terminals, the motor current limit is determined by that parameter. The positive motor current error signal may be applied in either motoring or braking operation. During motoring, any error signal is applied directly to reduce the negative current call signal, whereas during braking it is first compared with the other error signals to allow for selection and application of the highest one to reduce the positive current call signal. In this way the motor current limit is applied in both motoring and braking while using the absolute value of the motor current to generate the error signal.

In the drawings as hereinafter described, a preferred embodiment is depicted; however, various other modifications can be made thereto without departing from the true scope and spirit of the invention.

BRIEF DESCRIPTION OF THE DRAWINGS

FIG. 2 is a schematic illustration of the protective circuit portion of the preferred embodiment of the invention.

DESCRIPTION OF THE PREFERRED EMBODIMENT

Figure 1:
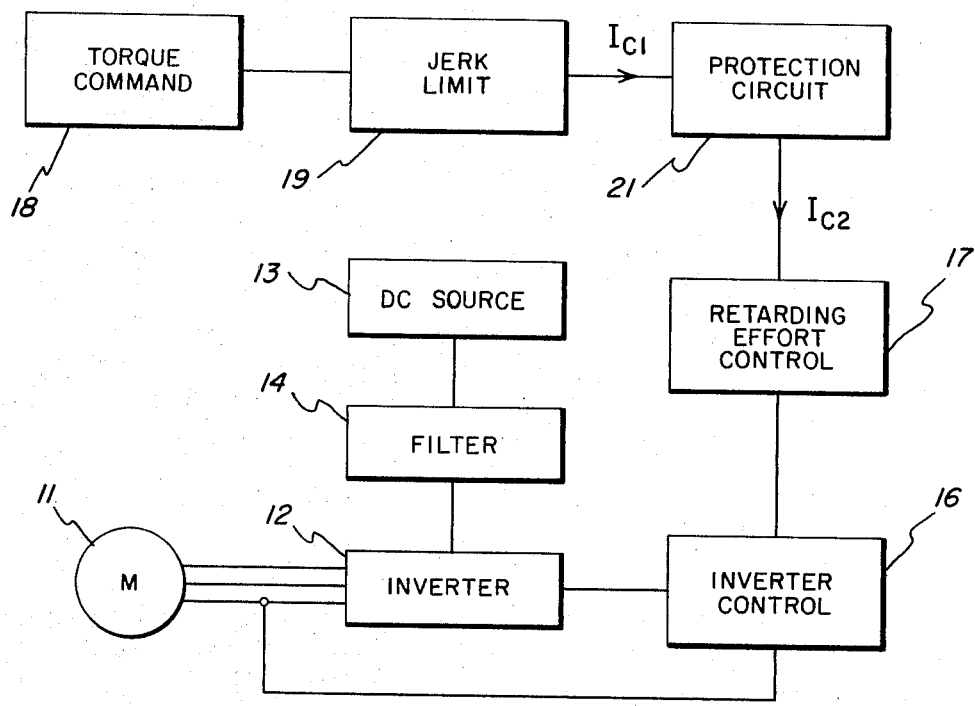
FIG. 1 is a block diagram of the preferred embodiment of the invention.

Referring now to FIG. 1, an inverter control system is shown wherein an a-c induction motor 11 is connected to receive a-c power from a three phase inverter 12 during motoring operation and to deliver a-c power thereto during periods of electrical braking. The inverter 12 which is connected to a dc source 13 through a low pass filter 14 generally comprises a circuit for converting dc power to a-c power and may be one of any of the various types shown and described in "Principles of Inverter Circuits," Bedford and Hoft, John Wiley & Sons Inc., 1964; however, the impulse commutated type (McMurray) is the preferred type.

The inverter 12 utilizes solid state components to change power from the dc source to variable frequency, variable voltage, three phase power to supply the motor 11 for variable speed operation. In order to obtain the desired torque output values it is necessary to vary the voltages and frequencies to the motor. Control of the inverter to obtain the desired frequency and voltage is thus established by an inverter control circuit 16 in response to a current command signal $I_{c2}$ as modified by the braking effort control 17 as shown and described by the patent application entitled "Braking Effort Control" filed concurrently herewith by the present inventor and assigned to the assignee of the present invention. In accordance with the system, a reduction of the current command signal while in a braking mode of operation will increase the frequency of the current from the motor to the inverter, while in motoring a reduction in the current command signal will bring about a similar reduction in the frequency of the current from the inverter to the motor. If the system is operating in square wave mode, the voltage will be constant, whereas if it is in the pulse-width-modulated mode (PWM) the voltage will increase or decrease along with the frequency.

The origin of the current command signal $I_{c2}$ is in the torque command module 18 which is selectively adjusted to provide a torque command signal $I_{c1}$ representative of the desired motor current and hence torque to be applied for either motor or braking. For motoring, the signal will have a negative polarity and for braking it will have a positive polarity, it being understood that the invention would just as well be used with an opposite polarity relationship. A jerk limit circuit represented by the block 19 may be included to automatically limit the rate of change of the torque command signal to a value consistent with passenger comfort (e.g., 3 mph/sec$^2$).

Under normal operating conditions the current command signal $I_{c2}$ will be equal to the torque command signal $I_{c1}$. However, during periods in which certain monitored conditions of the system exceed predetermined parameters, the protection circuit 21 comes in to play to reduce the $I_{c1}$ signal to a value compatible with the system.

A detailed illustration of the protection circuit 21 can be seen by reference to FIG. 2 wherein the system conditions that are monitored include the inverter dc voltage $V_{inv}$, the d-c line voltage $V_2$, and the peak motor current $I_{ac}$. These conditions may be sensed by any well-known method as for example by current transformers, operational amplifier isolators, Hall effect sensors, and magnetic amplifiers connected to the appropriate circuit terminals. The signals are fed into the respective summing amplifiers 22, 23 and 24 through resistors 27, 28, and 29 respectively. The summing amplifiers which are substantially identical except for differences in resistance values, comprise operational amplifiers 32, 33, and 34; gain setting resistors 37, 38 and 39; and grounding resistors 42, 43 and 44 respectively. Each summing amplifier is biased by a negative voltage input, and amplifiers 22 and 23 each has an output diode, with its cathode connected to the output of the operational amplifier and its anode connected to a common point 47 which is biased by a +15V potential through resistor 50. These diodes 48 and 49 have for their purpose to compare the output of the two summing amplifiers 22 and 23 and to select the most negative one for application to the common point 47 and thereby change the monitored conditions of the system in relation to the magnitude of the more negative amplifier output.

Referring now to the summing amplifier 22, a bias is provided by connecting a fixed negative d-c voltage of for example, −15 volts to the input terminal 53 by an appropriately sized resistor 54, such that the amplifier will have no input until the inverter voltage, $V_{inv}$ exceeds a predetermined parameter such as, for example 1,000 volts d-c. Whenever that parameter is exceeded by the $V_{inv}$ signal a proportionate negative voltage will appear on the cathode of the diode 48 and current will tend to flow from the common point 47. However, the current flow will not necessarily occur in that circuit but will depend on the voltage condition existing at the diode 49. The diode having the greater negative voltage on its cathode will dominate to conduct current from the point 47, and the remaining amplifier circuit will not be effective during that period of operation.

The summing amplifier 23 has provided therefor a negative voltage bias at its input by connecting a fixed negative dc voltage (i.e., 15 volts) to its input terminal 56 through resistance 57. Its operation is similar to that of the amplifier circuit 22 described hereinabove, with the circuit 23 being connected to receive as an input to the signal $V_L$ indicative of the dc voltage at the line. Again, the dc voltage at the line must exceed a predetermined value (e.g., 720 volts), as set by the values of the resistor 28 and 57, before a proportionate negative voltage will appear at the cathode of the diode 49 such that current will tend to flow from the common pin 47.

During motoring, it is possible that the line voltage $V_L$ may be above the predetermined limit which would thereby cause a negative signal to appear at the cathode of diode 49. This may occur for example if a number of other cars are dumping power into the line during regenerative braking, and would be undesirable because it would give a boost to the current call signal $I_{c1}$ and automatically speed up the controlled vehicle. To protect against this happening the predetermined limit is raised during motoring by the connection of −15V potential to the terminal 56 through a resistor 58. In this way the line voltage $V_L$ limiting circuit is effectively removed during periods of motoring operation.

The summing amplifier 24 on the other hand has a negative voltage bias which varies in accordance with the inverter dc voltage $V_{inv}$. A negative signal, obtained by inverting the actual inverter dc voltage, $V_{inv}$, is connected to the input terminal 59 through a resistor 61. The bias at terminal 59 is then decreased as the dc inverter voltage $V_{inv}$ is decreased, thereby providing for pickup of the circuit 24 at lower motor current conditions. This variable parameter is necessary since in an impulse commutated inverter of the McMurray type, the capability of commutating current is determinant on the dc inverter voltage. For a given motor current, as the inverter d-c voltage is decreased the negative voltage at the output of amplifier 34 is decreased and current flow through amplifier 24 is increased to thereby reduce the current call signal $I_{c1}$ as will be more fully explained hereinafter.

Referring now back to the current call signal $I_{c1}$, the signal is fed through an input resistor 62 to an inverting operational amplifier 63 having a feedback resistor 64 and ground resistor 66. Connected to the output of amplifier 63 is the anode of a diode 67 whose cathode is connected to junction 68. A bias is provided by connection of −15 V to junction 68 through a relative small resistor 70. This diode is one of three selecting diodes whose function are to select the appropriate current call signal in accordance with existing system conditions when operating in the braking mode, as will be explained more fully hereinafter. In cascade relationship with amplifier 63 is another inverting operational amplifier 69 having input resistor 71, feedback resistor 72, and ground resistor 73. A diode 74 is connected with its anode to the amplifier output and its cathode to a junction 76. The function of this diode is similar to that of diode 67 except that it comes into play during motoring as one of two selecting diodes to set the proper current call level. The diode 74 is biased by connection of −15V to the junction 76 through the resistor 75. A buffer amplifier 77 is connected to junction 76 and delivers the compensation current call signal $I_{c2}$ to the control circuitry as described hereinbefore.

In operation, when none of the established parameters are exceeded to bring in any of the three circuits described hereinabove, the current call signal $I_{c1}$ is not compensated and the signal $I_{c2}$ will be substantially equal thereto. If, however any of the limiting circuits comes into play the signal $I_{c2}$ will be reduced in magnitude from that of $I_{c1}$. When in the braking mode, any compensation to the signal $I_{c1}$, will be effected at the junction 68 by either the the stabilized error integrator 78 which is connected to terminal 47 by resistor 79, or by the stabilized error integrator 81 which is connected to the output of amplifier 24 by resistor 82. The circuit is arranged so that error integrator 78 can only move the $I_{c2}$ from braking toward motoring. Error integrator 81 can only reduce the magnitude of $I_{c2}$.

Referring now to the stabilized error integrator 78, it comprises an operational amplifier 83 having an inverting input 84, a feedback capacitor 86, and a feedback resistor 87, to provide proportional and integral control of the circuit by way of integrators in a conventional manner as shown and described in "Control System Analysis and Synthesis," D'Azzo & Houpis, McGraw-Hill, 1960. The amplifier 83 has a ground resistor 88, and a diode 89 with its anode connected to input terminal 84 and its cathode connected to ground. This diode is provided to ground terminal 47 whenever it is positive, to thereby allow the capacitor 86 to charge to the voltage level existing at junction 68. A selecting diode 91 is connected with its anode to the output of the amplifier 83 and its cathode to the junction 68. It acts along with the diode 67 to select during braking the least negative signal from either amplifier 63 or 83 to be applied to the junction 68.

As mentioned hereinabove, during motoring operation there is no input into amplifiers 22 and 23, and therefore the terminal 47 remains at a voltage more positive than zero. The diode 89 thus is conducting. There is then no output from the integrator 78, capacitor 86 remains charged to the voltage level of junction 68, and the current call signal is not compensated. During braking operation however, a positive current call signal $I_{c1}$, is fed into amplifier 63 and, if either of the parameters for $V_{inv}$ or $V_L$ is exceeded, the appropriate amplifier 22 or 23 will cause the potential of terminal 47 to go more negative than zero, and therefore the output of amplifier 83 to go more positive, which will in turn bring down the negative potential of junction 68 and thereby reduce $I_{c2}$ by a proportionate amount. If the overlimit conditions are severe the reduction of the negative signal $I_{c2}$ may go all the way to 0 and beyond into a positive or motoring signal. After the overlimit condition is relieved then the negative signal may build back up and normal braking would be resumed.

The error integrator 81 is similar in construction and operation as that of integrator 78, comprising operational amplifier 92 having an inverting input 93, a feedback capacitor 94, feedback resistor 95, ground diode 96 and ground resistor 97. Again a selector diode 98 is provided with its anode connected to the output of the amplifier 92 and its cathode connected to the junction 105. Connecting junction 105 to the junction 68 is a diode 99 which of course has a negative bias on its cathode side. This selector diode 98 acts in a manner similar to that described for diode 91 in selecting the least negative signal between those diodes 67, 91 or 98 during braking operation. A +15V potential is connected through a relatively large resistor 100 to the junction 105 for the purpose of precharging the integrator capacitor 94 to the level of $I_{c1}$. A diode 101 is connected across the amplifier 92 and diode 98 in inverse parallel relationship thereto to limit the range of the amplifier 92 such that the current call signal $I_{c2}$ can only be reduced by 0 by that circuit.

As mentioned hereinbefore only the absolute value of the motor current $I_{ac}$ is sensed and therefore, if there is an over-current condition, the output from amplifier 92 will always be positive whether in motoring or braking. Another type of selecting means must then be provided to determine how this output is to be applied. As discussed, during braking the signal from amplifier 92 is passed through diode 99. Connected in parallel relationship with diode 99 is a diode 102 having its anode connected to junction 105 and its cathode connected to junction 76, with a negative bias on its cathode side being provided by the −15V potential through resistor 75. The function of the two diodes 99 and 102 is then to apply the output from the integrator 81 to the more negative of the two junctions 68 and 76, with the former being more negative during braking and the latter being more negative during motoring.

Assume again that we are in a motoring condition and also that an overcurrent condition exists. There are no signals from amplifiers 22 and 23 and therefore the output of integrator 78 does not come into play. The negative signal $I_{c1}$ reaches the junction 76 and causes the diode 102 to turn on and conduct the positive signal from the integrator 81 which in turn reduces the current command signal $I_{c2}$.

In braking of course, the current call signal $I_{c1}$ is positive and the junction 76 is positive. Any signal from the integrator 81 will then pass along diode 99 to be compared with the signals on diodes 67 and 91 to thereby set the braking level with the most positive signal dominating.

An alternative method of protection is to use essentially the same circuit to direct control the ac induction motor slip frequency. The circuit then will select between two or more different error signals in the same manner as described hereinabove. The only difference is that the integration feature is eliminated from the circuits by removing capacitors 94 and 86. The input to the circuit, $I_{c1}$ is now current error (current command minus actual motor current) and the output will go to the slip error integrator of the type shown and described in the pending Pat. application Ser. No. 402,253 entitled, "Method and Apparatus for Automatic IR Compensation," filed in the name of the present inventor in Oct. 1, 1973 and assigned to the assignee of the present invention. The protective circuit described herein is then inserted in line 22 in FIG. 1 of the above referenced pending patent application.

What I claim as new and desire to secure by Letters Patent of the United States is:

1. An improved protective circuit for a propulsion system of the type having an ac motor, a dc power source, an inverter, and an inverter control circuit responsive to a current command signal to maintain the current flow between the inverter and motor at a level equal to the current command signal, wherein the improvement comprises:
  a. means for simultaneously monitoring a plurality of propulsion system parameters and comparing each with its associated predetermined limit to derive at a plurality of error signals;
  b. means for comparing said plurality of error signals and selecting the greatest one; and
  c. means for applying said greatest signal to modify the current command signal in direct proportion thereto so as to thereby reduce the magnitude of said greatest signal.

2. An improved protective circuit as set forth in claim 1 wherein said monitoring and comparing means includes means for detecting the inverter dc voltage level and further wherein its associated predetermined limit is a constant value.

3. An improved protective circuit as set forth in claim 1 wherein said monitoring and comparing means includes means for detecting the voltage level of the dc power source and further wherein its associated predetermined limit is a constant value.

4. An improved protective circuit as set forth in claim 1 wherein said monitoring and comparing means includes means for detecting the absolute value of the peak current flow between the inverter and the motor and further wherein its associated predetermined limit varies in proportion to the inverter dc voltage level.

5. An improved protective circuit as set forth in claim 1 wherein said comparing and selecting means comprises a plurality of parallel diodes connected to a common point with each diode having an error signal applied thereto.

6. An improved protective circuit as set forth in claim 1 wherein said propulsion system is of the type wherein, when the current command signal is of one polarity the inverter delivers power to the motor for motoring operation, and when the current command signal is of the opposite polarity the motor delivers power to the inverter for braking operation.

7. An improved protective circuit as set forth in claim 6 wherein said monitoring and comparing means includes means for detecting the inverter dc voltage level, and the dc power source level and further wherein the greater error signal derived is applied to reduce said current command signal during braking.

8. An improved protection circuit as set forth in claim 6 wherein said monitoring and comparing means includes means for detecting the absolute value of the motor current and further wherein the error signal derived therefrom during braking is compared with other error signals for reducing the current command signal and the error signal derived therefrom during motoring is applied directly to reduce the current command signal I claim.

9. An improved control circuit for a propulsion system of the type having an ac motor, a dc power source, and an inverter whose capacity of commutating current flow between the dc power source and the motor is determinate on the inverter dc voltage, wherein the improvement comprises:
  a. An inverter control circuit responsive to a modulated current command signal to maintain flow between the inverter and the motor at a level equal to said current command signal;
  b. means for sensing the current flow between the inverter and the ac motor and generating a current signal representative thereof;
  c. means for sensing the voltage level at the inverter dc terminals, and deriving a voltage signal representative thereof;
  d. means for comparing said current signal to said voltage signal to derive a compensating signal; and
  e. means for applying said compensating signal to said current command signal so as to modulate the current command signal in relation to the inverter dc voltage.

10. An improved control circuit as set forth in claim 9 wherein said inverter control circuit is responsive to one polarity of current command signal to cause current to flow from the inverter to the motor for motoring operation and responsive to an opposite polarity of current command signal to cause current to flow from the motor to the inverter for braking operation.

11. An improved control circuit as set forth in claim 9 wherein the current signal generated is representative of the absolute value of the peak current flow between the inverter and the ac motor.

12. An improved control circuit as set forth in claim 9 wherein the modulation of said current command signal is such that as the voltage level at the inverter dc terminals decreases, the current command signal decreases.

13. A protection circuit for a propulsion system having a dc power inverter, an ac motor and an inverter control system responsive to a modulated current command signal to control the amount of motoring current passing from the inverter to the motor when the current command signal is of one polarity and to control the amount of braking current passing from the motor to the inverter when the current command signal is of the opposite polarity, comprising:
  a. means for generating a current command signal representative of the desired current flow between the inverter and the motor, said current command signal when of a motoring polarity causing the inverter to deliver current to the motor for motoring and when of a braking polarity causing the motor to deliver current to the inverter for braking;

b. a first diode having its input terminal connected to receive said current command signal and having an output terminal;

c. a second diode having its input terminal connected to said first diode output terminal and having an output terminal;

d. inverting means connected between said first and second diodes for inverting the polarity at said first diode output terminal;

e. first means for reducing the voltage level of said first diode output terminal in response to a system condition only when the current command signal is of a predetermined polarity.

14. A protection circuit as set forth in claim 13 and including second means for reducing the voltage level of said second diode output terminal in response to a system condition only when the current command signal is of a polarity opposite from said predetermined polarity.

15. A protection circuit as set forth in claim 13 wherein said first reducing means comprises:

a. an integrator having an input signal derived from the difference between a predetermined system condition and a predetermined desired limit, and an output connected to the first diode output terminal; and b. a selector diode connected between the integrator output terminal; wherein the diode which is at the higher voltage level between said first diode and said selector diode will conduct current.

16. A protection circuit as set forth in claim 15 wherein said system predetermined condition is the dc voltage level of the inverter and further wherein said predetermined desired limit is a constant value.

17. A protection circuit as set forth in claim 14 wherein said second reducing means comprises:

a. an integrator having an input signal derived from the difference between a predetermined system condition and a predetermined desired limit, and an output connected to the second diode output terminal; and b. a selector diode connected between the integrator output and said second diode output terminal; wherein the diode which is at the higher voltage level between said second diode and said selector diode will conduct.

18. A protection circuit as set forth in claim 17 wherein said system predetermined condition is the motor current level and further wherein said predetermined desired limit a variable limit responsive to the dc voltage level of the inverter.

19. An improved protective circuit for a propulsion system of the type having an induction motor, a dc power source, an inverter, and an inverter control circuit responsive to a current command signal to maintain the current flow between the inverter and motor at a level equal to the current command signal, wherein the improvement comprises:

a. means for simultaneously monitoring a plurality of propulsion system parameters and comparing each with its associated predetermined limit to derive at a plurality of error signals;

b. means for comparing said plurality of error signals and selecting the greatest one; and c. means for applying said greatest signal to modify the slip of the induction motor in direct proportion thereto so as to thereby reduce the magnitude of said greatest signal.

20. An improved control circuit for a propulsion system of the type having an induction motor, a dc power source, and an inverter whose capability of commutating current flow between the dc power source and the motor is determinate on the inverter dc voltage, wherein the improvement comprises:

a. an inverter control circuit responsive to a modulated current command signal to maintain flow between the inverter and the motor at a level equal to said current command signal;

b. means for sensing the current flow between the inverter and the ac motor and generating a current signal representative thereof;

d. means for sensing the voltage level at the inverter dc terminals, and deriving a voltage signal representative thereof;

d. means for comparing said current signal to said voltage signal to derive a compensating signal; and e. means for applying said compensating signal to modify the slip of the induction motor to thereby reduce the magnitude of said compensating signal.

* * * * *

UNITED STATES PATENT OFFICE
CERTIFICATE OF CORRECTION

PATENT NO. : 3,859,579
DATED : January 7, 1975
INVENTOR(S) : A. B. Plunkett

It is certified that error appears in the above-identified patent and that said Letters Patent are hereby corrected as shown below:

Column 1, line 41, delete "the" and substitute -- a --

Column 7, line 6, delete "direct" and substitute -- directly --

Column 8, line 20, delete "capacity" and substitute -- capability --

Column 10, line 39, delete "d." and substitute -- c. --

Signed and sealed this 29th day of April 1975.

(SEAL)
Attest:

RUTH C. MASON
Attesting Officer

C. MARSHALL DANN
Commissioner of Patents
and Trademarks